United States Patent [19]

Suzuyama et al.

[11] Patent Number: 4,862,319
[45] Date of Patent: Aug. 29, 1989

[54] GAS-INSULATED SWITCHGEAR

[75] Inventors: Hiroshi Suzuyama; Yoshirou Suzuki; Minoru Sakaguchi, all of Hitachi, Japan

[73] Assignee: Hitachi, Ltd., Tokyo, Japan

[21] Appl. No.: 163,751

[22] PCT Filed: Oct. 5, 1987

[86] PCT No.: PCT/JP87/00742
§ 371 Date: Feb. 8, 1988
§ 102(e) Date: Feb. 8, 1988

[87] PCT Pub. No.: WO88/02941
PCT Pub. Date: Apr. 21, 1988

[30] Foreign Application Priority Data
Oct. 7, 1986 [JP] Japan .................. 61-237254

[51] Int. Cl.⁴ .......................... H02B 1/20
[52] U.S. Cl. .................. 361/341; 200/48 R
[58] Field of Search .......... 174/71 B, 72 B; 307/147; 200/48 R, 148 R, 148 B, 148 D, 144 R; 361/332, 333, 335, 341, 378, 429

[56] References Cited

U.S. PATENT DOCUMENTS

| | | | |
|---|---|---|---|
| 3,823,346 | 7/1974 | Olsen | 361/341 |
| 4,032,820 | 6/1977 | Oishi | 361/333 |
| 4,493,009 | 1/1985 | Lorenz | 361/341 |
| 4,503,481 | 3/1985 | Fujiya | 361/341 |
| 4,638,403 | 1/1987 | Amano | 361/341 |

FOREIGN PATENT DOCUMENTS 163425 12/1976 Japan .
59-106808 6/1984 Japan .
59-165905 9/1984 Japan .
59-185107 10/1984 Japan .

Primary Examiner—Gerald P. Tolin
Attorney, Agent, or Firm—Antonelli, Terry & Wands

[57] ABSTRACT

A gas-insulated switchgear forming a bus section unit used in substations. In a double bus scheme where non-segregated 3-phase gas-insulated buses are laid on a horizontal installation area, this invention applies to a bus structure in which sectionalized gas-insulated main buses arranged in line on the same axis are connected by the bus section unit. By the side of the sectionalized gas-insulated main buses are installed bus section circuit breakers for three phases. A shifted bus section leading from one of the sectionalized main buses is disposed above the third gas-insulated main bus which is located farther from the circuit breaker. The shifted bus section is used to connect the sectionalized main buses. This structure improves the seismic resistance of the bus section unit without increasing the installation area of the unit.

22 Claims, 5 Drawing Sheets

GAS-INSULATED SWITCHGEAR

TECHNICAL FIELD

The present invention relates to a gas-insulated switchgear and more specifically to a gas-insulated switchgear with a bus section unit used in substations.

BACKGROUND ART

As described in the electrical engineers' journal "Denki Kyodo Kenkyu" (Electrical Joint Research), volume 41, No. 5, page 67–68 and in the Japanese Utility Model Laid-Open No. 80616/1981, it is known that measures taken in substations to improve reliability of power systems include duplication of the main bus; sectionalizing the bus to make the sectioned buses individually operational and to provide a bus section unit to connect the sectioned buses; and providing a bus tie unit to connect parallel double buses and connecting feeder units between the double buses.

The above substation configuration is explained by referring to FIG. 1 which is a one-line diagram of the substation circuitry. The main bus 2 and the main buses 1 and 3 constitute a double bus scheme in which two parallel main buses are laid. The main buses 1 and 3, which together form one of the two parallel buses, are arranged in line on the same axis and are disconnectably connected with each other by a bus section unit S. The bus section unit S consists of a disconnecting switch 4b connected at one end to the main bus 1, another disconnecting switch 4a connected at one end to the main bus 3, and a circuit breaker 5 connected between these disconnecting switches. The parallel main buses 1 and 2 or buses 2 and 3 are connected by a bus tie unit T in such a way as to be disconnectable so that power can be interchanged between these buses. A feeder unit F is disconnectably connected between the main buses 1 and 2 or between the buses 2 and 3 to supply transformers and loads.

In the above configuration, for inspection or during failure of the main bus 3 which is connected to the main bus 1 through the bus section unit S, the circuit breaker 5 is operated, the disconnecting switches 4a, 4b are opened, and the bus tie section T is also operated so as to leave the remaining main buses 1 and 2 operational.

For application in substations with the above configuration, the Japanese Utility Model Laid-Open No. 80616/1981 shows the bus section unit S which is formed by a gas-insulated switchgear. In this example, two separated gas-insulated main buses arranged in line on the same axis on the installation area are connected by an auxiliary gas-insulated jointing bus which is located by the side of the opposing ends of the two aligned gas-insulated main buses. The gas-insulated main buses and the auxiliary gas-insulated jointing bus need be arranged parallelly. This increases the widthwise dimension, which in turn increases the installation area of the gas-insulated switchgear used as the bus section unit.

DISCLOSURE OF THE INVENTION

The object of this invention is to provide a gas-insulated switchgear forming a bus section unit which has a reduced installation area and an improved seismic resistance.

The gas-insulated switchgear of this invention which forms the bus section unit has the following configuration. Non-segregated 3-phase gas-insulated main buses are arranged in two almost parallel straight lines. On one of the two parallel lines and on the same axis are sectionalized gas-insulated main buses, by the side of which are arranged 3-phase circuit breakers. Of the gas-insulated main buses, the sectionalized gas-insulated main buses which are located closer to the circuit breaker than the third main bus on the second parallel line are interconnected by the bus section unit. One of the sectionalized gas-insulated main buses on the breaker side is provided with a shifted bus section which is disposed above the third gas-insulated main bus which is located farther from the circuit breaker. Through the shifted bus section, the sectionalized gas-insulated main bus is connected to the circuit breaker.

As mentioned above, the shifted bus section is provided to one of the two sectionalized gas-insulated main buses which are located near the circuit breaker. And the shifted bus section is also disposed above the third gas-insulated main bus located on the far side with respect to the circuit breaker. In other words, it is supported on the third gas-insulated main bus. This allows the shifted bus section to be supported at a relatively low level, improving seismic resistance of the bus section unit. This structure also keeps the installation area to the minimum. Moreover, as detailed later, the position of the shifted bus section makes the structure of the bus section unit simple.

BEST MODE FOR CARRYING OUT THE INVENTION

Embodiments of this invention are described in the following by referring to the attached drawings.

Figure 1:
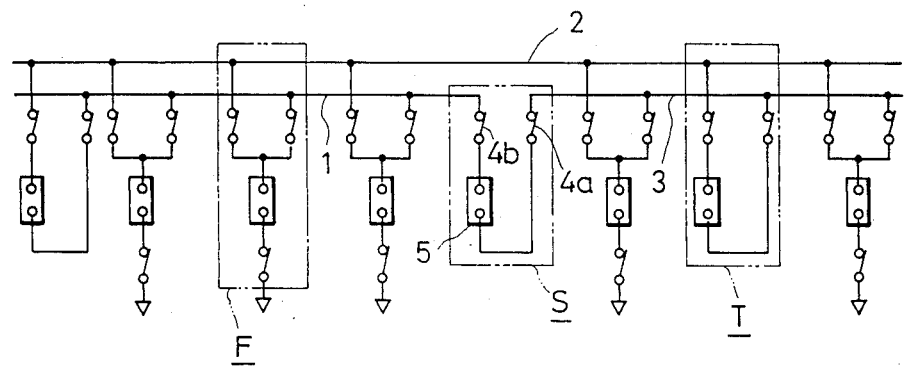
FIG. 1 is a single line circuitry showing the configuration of the substation to which this invention is applied.
Figure 2:
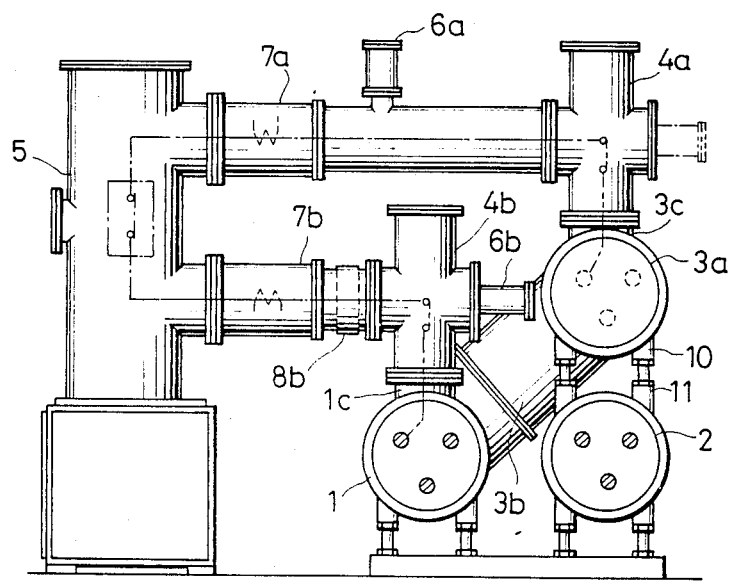
FIG. 2 is a front view of a gas-insulated switchgear as one embodiment of the invention that forms a bus section unit.
Figure 3:
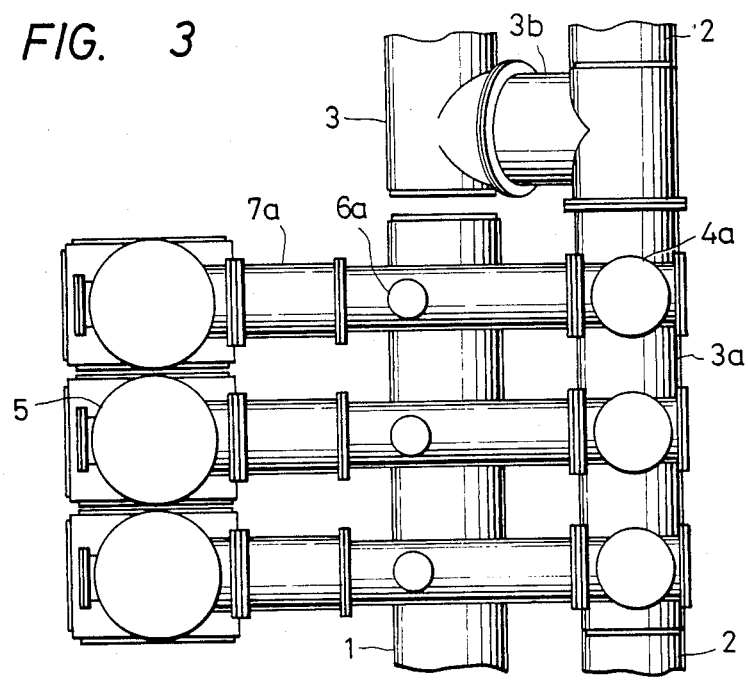
FIG. 3 is a plan view of FIG. 2.
Figure 4:
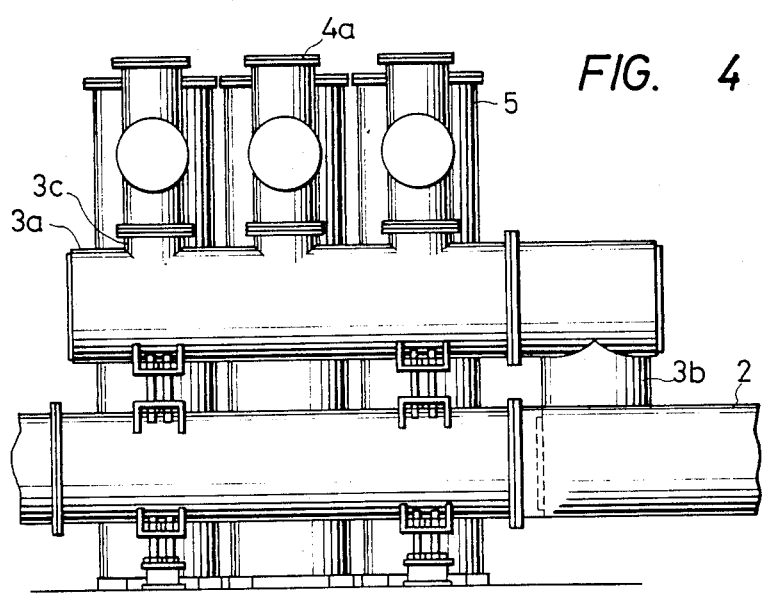
FIG. 4 is a side view of FIG. 2.

FIGS. 2 to 4 are the front, plan and side views, respectively, of the gas-insulated switchgear that forms a bus section unit. Gas-insulated main buses 1 and 3, arranged on basically the same axis but separated from each other, and a continuous gas-insulated main bus 2 are laid on two almost horizontal and parallel straight lines disposed close to the installation floor. These two lines of buses form a non-segregated 3-phase double bus structure. On one side of these double gas-insulated main buses are installed vertical type circuit breakers 5 for three phases that are used in the bus section unit. The gas-insulated main bus installed close to the circuit breakers 5 is made up of the sectionalized gas-insulated main buses 1 and 3 arranged on the same line which are connected and disconnected from each other by the bus section unit, as shown in FIG. 3.

Next, we will explain the connection of the sectionalized gas-insulated main buses 1, 3. As is seen from FIG. 2, the end portion of the gas-insulated main bus 3 is disposed above the gas-insulated main bus 2 which is located on the far side with respect to the circuit breakers 5. The end portion of the gas-insulated main bus 3 is supported on the gas-insulated main bus 2 by connecting, as with bolts, the legs 10 formed under the bus end portion to the support projections 11 of the main bus 2. This is explained in more detail by referring to FIGS. 3 and 4, which are the plan and side views of FIG. 2 respectively. The gas-insulated main bus 3 extends along the same straight line that passes through the axis of the gas-insulated main bus 1 until it comes close to the end surface of the gas-insulated main bus 1. The gas-insulated main bus 3 is then connected to a shifted bus section 3a through flange via a bus branch section 3b which extends slantwise in the radial direction from the main bus 3. The shifted bus section 3a constitutes an end portion of the gas-insulated main bus 3 disposed above the gas-insulated main bus 2, as shown in FIG. 2, and extends in the same direction as the gas-insulated main bus 1 to form a bus overlapping structure. The axial length of the shifted bus section 3a is the one required to form the bus section unit.

Next, we will explain the connection of the above gas-insulated main bus structure with the circuit breakers 5. The circuit breakers 5 each have a pair of vertically arranged connectors, to each of which is connected a connecting vessel 7a, 7b incorporating a current transformer. These form an electric path as indicated by one-dot line. As shown in FIG. 2, the gas-insulated main bus 1 has a branch lead portion 1c at the top to which a disconnecting switch 4b incorporating an earthing switch 6b is connected. The disconnecting switch 4b is also connected to the connecting vessel 7b through a flexible joint 8b. The shifted bus section 3a of the gas-insulated main bus 3 has a branch lead portion 3c at the top to which a disconnecting switch 4a is connected. The disconnecting switch 4a is also connected to the connecting vessel 7a through a jointing conductor incorporating an earthing switch 6a.

In the above bus construction, since the gas-insulated main bus 3 on the circuit breaker side is provided with the shifted bus section 3a which is disposed and supported above the gas-insulated main bus 2 that is located farther from the circuit breaker 5, there is no need to increase the floor space for accommodation of the shifted bus section 3a. Moreover, since the shifted bus section 3a can be positioned at a relatively low level, the switchgear exhibits a good seismic resistance. The sectionlized gas-insulated main buses 1, 3 that are isolated and connected together by the circuit breakers 5 as indicated by one-dot line are laid basically on the same straight line. But the provision of the shifted bus section 3a puts the end portions of the two sectionalized buses in staggered relationships, making it possible to dispose the devices making up the bus section unit such as the circuit breakers 5 and disconnecting switches 4a, 4b in almost the same vertical plane in connecting the gas-insulated main buses 1, 3 with the circuit breakers 5. This in turn allows the bus section unit to be fabricated without significantly increasing the axial length of the gas-insulated main buses. Still another advantage of this switchgear is an economy because the disconnecting switches 4a, 4b can be of the same structure using a vessel which is cross-shaped when viewed from the side and because the main body and shifted bus section 3a of the gas-insulated main bus 3 are joined linearly slantwise by the straight branch section 3b, as shown in FIG. 2.

While in the above embodiment the disconnecting switch 4a and the earthing switch 6a are installed separate, they may be formed as one device like the disconnecting switch 4b incorporating the earthing switch 6b. This will enhance exchangeability between these disconnecting switches and also facilitate manufacture.

Figure 5:
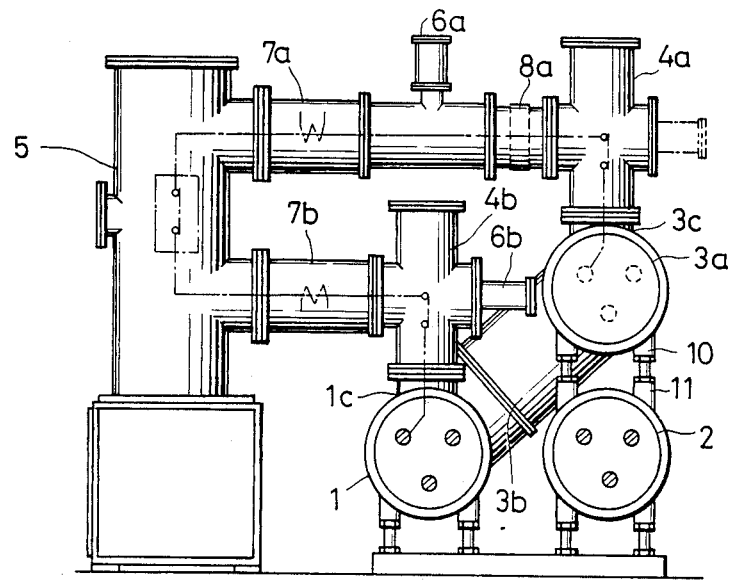
FIG. 5 is a front view of another gas-insulated switchgear, a variation of FIG. 2.

In another embodiment of FIG. 5, which is a variation of the first embodiment, the flexible joint 8b inserted in the lower electrical path of the vertical type circuit breaker 5 in FIG. 2 is omitted to directly connect the disconnecting switch 4b and the connecting vessel 7b. Instead, a flexible joint 8a is disposed adjacent to the disconnecting switch 4a on the upper electrical path to absorb dimensional changes and errors resulting from installations. Other parts have the same structure as that of FIG. 2. The provision of the flexible joint 8a on the upper electrical path allows the vertical type circuit breakers 5 to be installed closer to the gas-insulated main buses, further reducing the installation area of the bus section unit.

Figure 6:
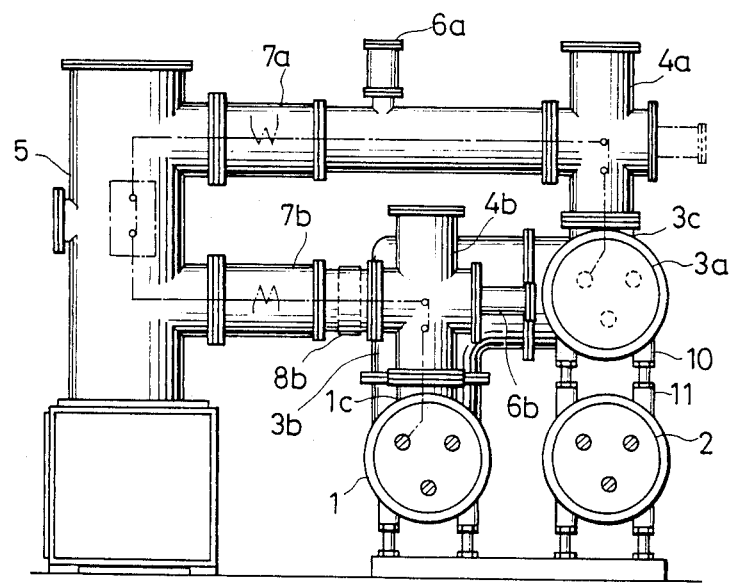
FIG. 6 is a front view of a gas-insulated switchgear as another embodiment of the invention that forms the bus section unit.
Figure 7:
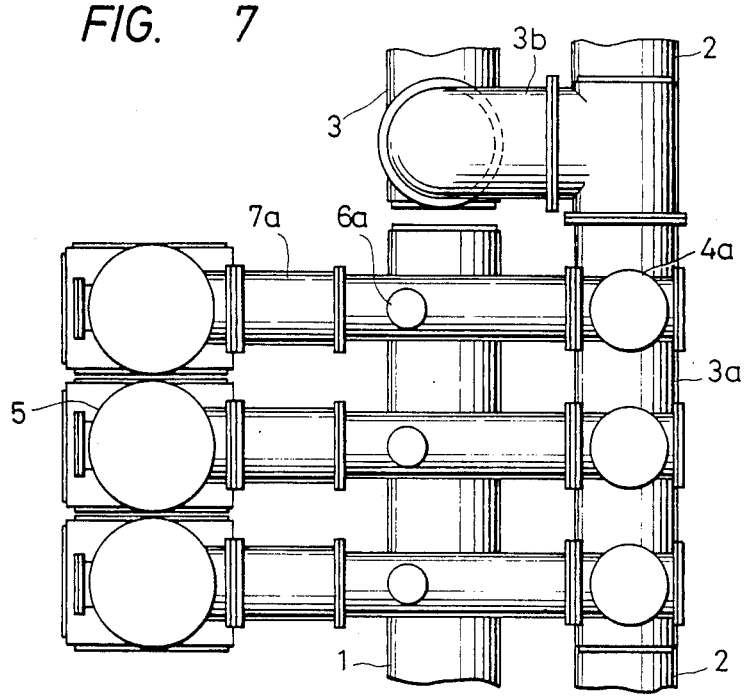
FIG. 7 is a plan view of FIG. 6.
Figure 8:
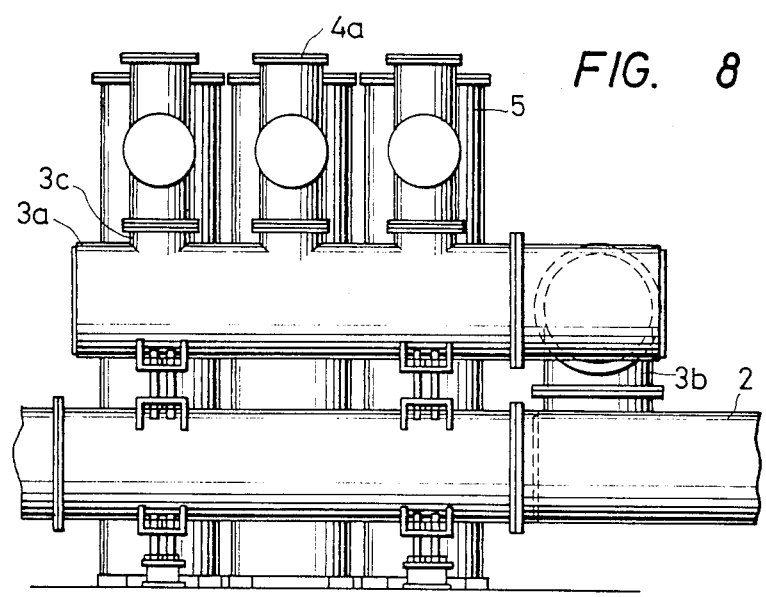
FIG. 8 is a side view of FIG. 6.

In a further embodiment of this invention shown in FIGS. 6 to 8, the sectionalized gas-insulated main buses 1, 3, as with the embodiment of FIGS. 2 to 4, are lined on the same axis and the circuit breakers 5 and other devices are of the same structure as the first embodiment. The only difference is the shape of the bus branch section 3b that connects the gas-insulated main bus 3 with the shifted bus section 3a, which forms the end portion of the bus 3. That is, the bus branch section 3b is vertically raised from the flange of the gas-insulated main bus 3 to a level of the flange of the shifted bus section 3a which is disposed above the gas-insulated main bus 2. The bus branch section 3b is then bent almost horizontally in an inverted-L shape to be connected to the shifted bus section 3a. The use of the bus branch section 3b which is bent at right angles produces the same effect as the previous embodiments. Not only does the angled bus branch section 3b simplify the manufacture of the flanges of the gas-insulated main bus 3 and the shifted bus section 3a but also facilitate the jointing work as the bus branch section 3b can be supported on the gas-insulated main bus 3 during the job.

Figure 9:
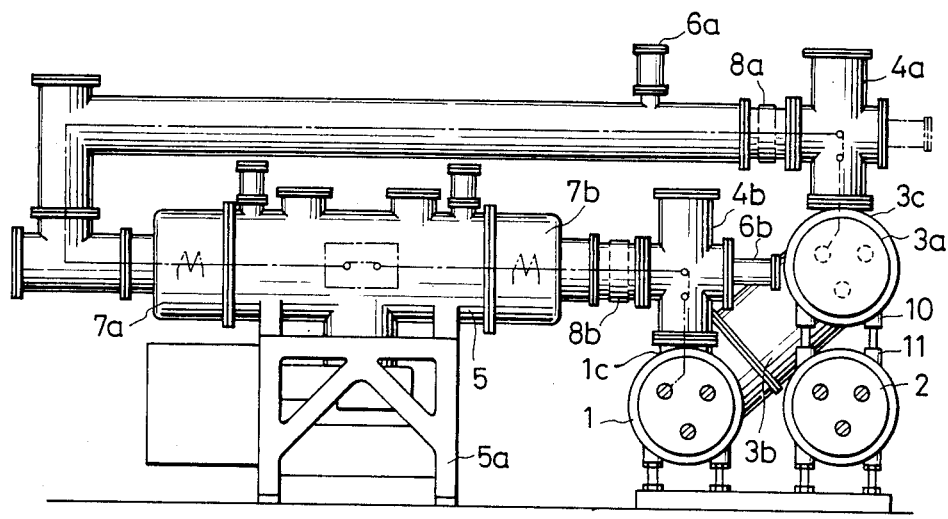
FIG. 9 is a front view of a gas-insulated switchgear as still another embodiment of the invention that forms the bus section unit.
Figure 10:
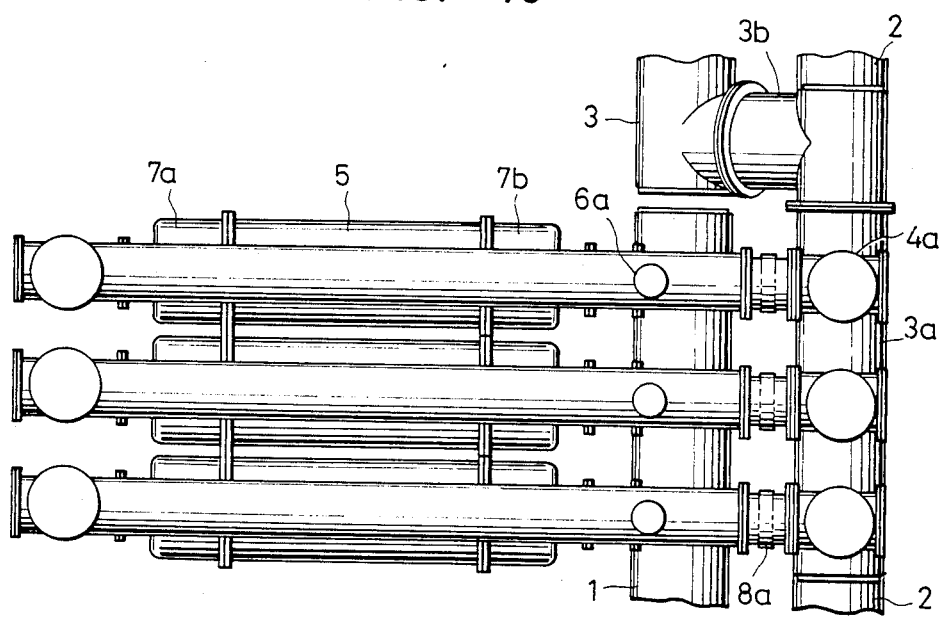
FIG. 10 is a plan view of FIG. 9.

Still another embodiment of the invention is shown in FIGS. 9 and 10. Circuit breakers 5 in this embodiment are of a lateral type mounted on a stand 5a and are connected to connecting vessels 7a which are located on the far side with respect to the gas-insulated main bus 1. The connecting vessels 7a are also connected to disconnecting switches 4a. The electrical path from the bus 1 to the disconnecting switch 4a is folded to pass over the circuit breaker 5. Other structures are the same as those of FIGS. 2 to 4. When the circuit breaker 5 of a lateral type is used, the horizontal dimension becomes large, so that flexible joints 8a, 8b need be inserted in the upper and lower electrical path. Also since the bus section unit as a whole extends laterally, the installation area inevitably increases. However, when the circuit voltage of the substation is high, the vertical type circuit breaker cannot be used since the height of the bus section unit becomes large greatly deteriorating the seismic resistance of the bus section unit. The use of the lateral type circuit breaker, on the contrary, will not impair the seismic resistance.

In the foregoing embodiments of the invention, the bus section unit is provided to one of the gas-insulated double buses at substations employing the double bus scheme. The invention is also applicable to bus section units that are provided to both of the parallel, sectionalized, gas-insulated double buses.

EFFECT OF THE INVENTION

As mentioned above, in a substation with double bus scheme, the shifted bus section formed at the end of one of the sectionalized, gas-insulated, breaker-side main buses—which are located near the circuit breaker and aligned with each other on the same axis—is disposed in such a way as to be supported above the gas-insulated main bus which is laid parallel to the sectionalized breaker-side main buses and which is located on the far side with respect to the circuit breaker. The shifted bus section and the other sectionalized, gas-insulated, breaker-side main bus are staggered to form the axially overlapping bus structure. Thus, the shifted bus section is supported and connected by the bus branch section at a relatively low level, so that the bus section unit with good seismic withstandability can be obtained without increasing the installation floor space.

We claim:

1. A gas-insulated switchgear forming a bus section unit comprising:
   two three-phase common enclosure type gas-insulated main buses each of which is firmly supported on a rigid support surface along substantially parallel straight lines in an installation area; one of the gas-insulated main buses being sectionalized into two gas-insulated main buses; the sectionalized gas-insulated main buses being arranged in line on the same axis;
   a circuit breaker for each phase of the three phases having a disconnecting switch at each terminal thereof; the circuit breakers being connected between the two sectionalized gas-insulated main buses; the circuit breakers being disposed by a side of the sectionalized gas-insulated main buses; and
   a shifted bus section formed at the end of one of the two sectionalized gas-insulated main buses; the shifted bus section being supported on the gas-insulated main bus; the shifted bus section being staggered from the other sectionalized gas-insulated main bus to form an axially overlapping bus structure; the shifted bus section being connected to the other sectionalized gas-insulated main bus via the circuit breaker and the disconnecting switches which are respectively mounted on the shifted bus section and the other sectionalized gas-insulated main bus.

2. A gas-insulated switchgear as set forth in claim 1, wherein the shifted bus section and one of the sectionalized gas-insulated main buses are linearly interconnected by a bus branch section which is disposed slantwise.

3. A gas-insulated switchgear as set forth in claim 1, wherein the shifted bus section and one of the sectionalized gas-insulated main buses are interconnected by a bus branch section which is formed substantially in the shape of an inverted letter L.

4. A gas-insulated switchgear as set forth in claim 1, wherein the bus section unit employs a vertical type circuit breaker.

5. A gas-insulated switchgear as set forth in claim 1, wherein the bus section unit employs a lateral type circuit breaker.

6. A gas-insulated switchgear as set forth in claim 1, wherein the shifted bus section leading from the first sectionalized gas-insulated main bus and the second sectionalized gas-insulated main bus together form the axially overlapping bus structure and each has a branch lead portion at top surfaces thereof the disconnecting switches are connected to the respective branch lead portions.

7. A gas-insulated switchgear as set forth in claim 1, wherein the disconnecting switches each are positioned a vessel which is cross-shaped when viewed from the side.

8. A gas-insulated switchgear forming a bus section unit comprising:
   two three-phase common enclosure type gas-insulated main buses firmly supported along two substantially parallel first and second straight lines at an installation area; the gas-insulated main bus on the first straight line being sectionalized into two gas-insulated main buses that are arranged in line on the same axis;
   a vertical type circuit breaker for each of said three phases each having an upper and a lower disconnecting switch at each terminal thereof; the circuit breakers being connected between the two sectionalized gas-insulated main buses; the circuit breakers being disposed by a side of the sectionalized gas-insulated main buses on the first straight line; and
   a shifted bus section formed at the end of one of the sectionalized gas-insulated main buses; the shifted bus section being supported on the gas-insulated main bus which is arranged along the second straight line located further than the first straight line from the circuit breakers; the shifted bus section being staggered from the other sectionalized gas-insulated main bus so that the shifted bus section and the other sectionalized main bus are disposed at different levels along their axes to form an axially overlapping bus structure; the shifted bus section being connected to the other sectionalized gas-insulated main bus via the circuit breaker and the disconnecting switches; the disconnecting switches being in upper and lower electrical paths that are connected to opposite ends of the circuit breaker.

9. A gas-insulated switchgear as set forth in claim 8, wherein the shifted bus section and one of the sectionalized gas-insulated main buses are linearly interconnected by a bus branch section which is disposed slantwise.

10. A gas-insulated switchgear as set forth in claim 8, wherein the shifted bus section and one of the sectionalized gas-insulated main buses are interconnected by a bus branch section which is formed substantially in the shape of an inverted letter L.

11. A gas-insulated switchgear forming a bus section unit comprising:
   two three-phase common enclosure type gas-insulated main buses firmly supported along two substantially parallel first and second straight lines at an installation area; the gas-insulated main bus on the first straight line being sectionalized into two gas-insulated main buses that are arranged in line on the same axis;

a lateral type circuit breaker for each of said three phases each having a disconnecting switch at each terminal thereof; the circuit breakers being connected between the two sectionalized gas-insulated main buses; the circuit breakers being supported on the installation area by a side of the sectionalized gas-insulated main buses on the first straight line; and a shifted bus section formed at the end of one of the two sectionalized gas-insulated main buses; the shifted bus section being supported on the gas-insulated main bus which is arranged along the second straight line located further than the first straight line from the circuit breakers; the shifted bus section being staggered from the other sectionalized gas-insulated main bus so that the shifted bus section and the other sectionalized main bus are disposed at different levels along their axes to form an axially overlapping bus structure; the shifted bus section being connected to the other sectionalized gas-insulated main bus via the circuit breaker and the disconnecting switches; the disconnecting switches being in electrical paths returning and passing over the circuit breaker and in an electrical path on the side of the gas-insulated main bus.

12. A gas-insulated switchgear as set forth in claim 11, wherein the shifted bus section and one of the sectionalized gas-insulated main buses bus are linearly interconnected by a bus branch section which is disposed slantwise.

13. A gas-insulated switchgear as set forth in claim 11, wherein the shifted bus section and one of the sectionalized gas-insulated main buses or the first main bus are interconnected by a bus branch section which is formed substantially in the shape of an inverted letter L.

14. A gas-insulated switchgear forming a bus section unit comprising:
two three-phase common enclosure type gas-insulated main buses firmly supported along two substantially parallel first and second straight lines at an installation area; the gas-insulated main bus on the first straight line being sectionalized into two gas-insulated main buses that are arranged in line on the same axis;

a circuit breaker for each of said three phases each having a disconnecting switch at each terminal thereof; the circuit breakers being connected between the two sectionalized gas-insulated main buses; the circuit breakers being disposed by a side of the sectionalized gas-insulated main buses on the first straight line; and a shifted bus section formed at the end of one of the two sectionalized gas-insulated main buses; the shifted bus section being supported above the gas-insulated main bus which is arranged along the second straight line located further than the first straight line from the circuit breakers; the shifted bus section being staggered from the other sectionalized gas-insulated main bus to form an axially overlapping bus structure; the shifted bus section being connected to the other sectionalized gas-insulated main bus via the circuit breaker and the disconnecting switches; the disconnecting switches being inserted in electrical paths extending from opposite sides of the circuit breaker.

15. A gas-insulated switchgear as set forth in claim 14, wherein the shifted bus section and one of the sectionalized bus-insulated main buses are linearly interconnected by a bus branch section which is disposed slantwise.

16. A gas-insulated switchgear as set forth in claim 14, wherein the shifted bus section and one of the sectionalized gas-insulated main buses are interconnected by a bus branch section which is formed substantially in the shape of an inverted letter L.

17. A gas-insulated switchgear as set forth in claim 14, wherein the bus section unit employs vertical type circuit breakers.

18. A gas-insulated switchgear as set forth in claim 14, wherein the bus section unit employs lateral type circuit breakers.

19. A gas-insulated switchgear as set forth in claim 14, wherein the shifted bus section leading from the first sectionalized gas-insulated main bus and the second sectionalized gas-insulated main bus together from the axially overlapping bus structure and each has a branch lead portion at top surfaces thereof, and the disconnecting switches are connected to the respective branch lead portions.

20. A gas-insulated switchgear as set forth in claim 14, wherein each disconnecting switch is positional in a vessel which is cross-shaped when viewed from the side.

21. A gas-insulated switchgear forming a bus section unit comprising:
two three-phase common enclosure type gas-insulated main buses firmly supported along two substantially parallel first and second straight lines at an installation area; the gas-insulated main bus on the first straight line being sectionalized into two gas-insulated main buses that are arranged in line on the same axis;

a vertical type circuit breaker for each of the three phases having a disconnecting switch at each terminal thereof; the circuit breakers being connected between the two sectionalized gas-insulated main buses; the circuit breakers being disposed by a side of the sectionalized gas-insulated main buses on the first straight line; and a shifted bus section formed at the end of one of the two sectionalized gas-insulated main buses; the shifted bus section being supported above the gas-insulated main bus which is arranged along the second straight line located further than the first line from the circuit breakers; the shifted bus section being staggered from the other sectionalized gas-insulated main bus so that the shifted bus section and the other sectionalized main bus are disposed at different levels along their axes to form an axially overlapping bus structure; the shifted bus section being connected to the other sectionalized gas-insulated main bus via the vertical type circuit breaker and the disconnecting switches being in an upper electrical path and a lower electrical path and connected to opposite ends of the circuit breakers; the disconnecting switches each being located in a vessel shaped like a cross when viewed from the side.

22. A gas-insulated switch gear forming a bus section unit comprising:
two three-phase common enclosure type gas-insulated main buses, each enclosure being firmly supported on a rigid support surface along substantially parallel lines in an installation area;

one of the main buses being sectionalized into two main buses which are arranged in line to have a common axis;

means for electrically connecting together the sectionalized buses including a separate circuit breaker for each of said three phases with each breaker having a disconnecting switch associated with terminal thereof; the circuit breaker in each phase being connected between the two sectionalized main buses; each circuit breaker being disposed within an enclosure separately supported on said support surface area at a side of the enclosures for the sectionalized main buses; and a shifted bus section enclosure including one of said disconnecting switches for each phase, said shifted bus section being positioned at an end of one of the two sectionalized main buses; the shifted bus section enclosure being supported on the enclosure for the other of said main buses; the axis of the shifted bus section enclosure being substantially parallel to and off-set from the parallel line associated with said sectionalized main buses; the disconnecting switches associated with the shifted bus section being positioned along a side of the other of said two sectionalized main buses to form an axial overlapping relationship of the buses thereby shortening a switch gear dimension; the shifted bus section enclosure being connected to the other sectionalized main bus enclosure via the circuit breaker and its disconnecting switches that are in a separate enclosure for each phase.

* * * * *